Sept. 7, 1954
L. H. JAQUAY
2,688,622
PROCESS FOR PRODUCING MALEIC ANHYDRIDE
Filed Sept. 21, 1951
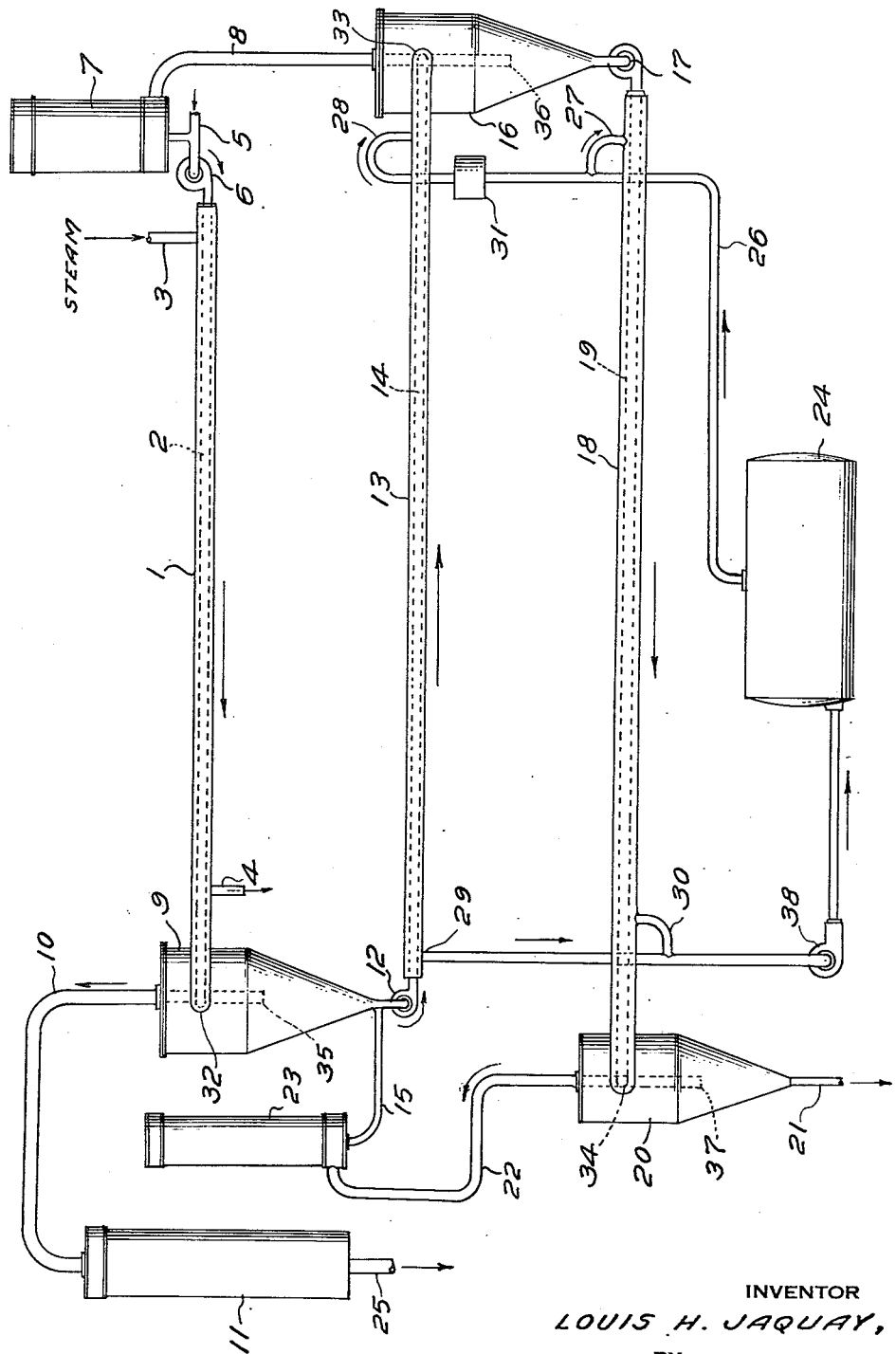
INVENTOR
LOUIS H. JAQUAY,
BY James T. Dunn
ATTORNEY Patented Sept. 7, 1954

2,688,622

UNITED STATES PATENT OFFICE 2,688,622

PROCESS FOR PRODUCING MALEIC ANHYDRIDE

Louis H. Jaquay, Bridgeville, Pa., assignor to American Cyanamid Company, New York, N. Y., a corporation of Maine Application September 21, 1951, Serial No. 247,648

2 Claims. (Cl. 260—346.8)

This invention relates to a process for converting maleic acid into maleic anhydride, and more particularly, this invention relates to a process of removing the bound and unbound water from a maleic acid solution in a plurality of partial vaporization steps, followed by a plurality of partial condensation and separation steps. Still further, this invention relates to a process for treating a comparatively dilute aqueous solution of maleic acid by suddenly heating it to a temperature substantially above the vaporization temperature of the water and maleic acid present in the solution, wherein the solution becomes partially vaporized, followed by a sudden cooling of the vapor-liquid mixture, wherein unbound water is substantially completely removed and the mixture of maleic acid and maleic anhydride produced is separated therefrom. This technique of partial vaporization, followed by condensation and separation, is continued until the bound and unbound water is substantially completely removed and the maleic anhydride is recovered in substantially pure form.

One of the objects of the present invention is to recover maleic anhydride from aqueous maleic acid solutions by subjecting the solution to a plurality of partial vaporization treatments, followed by a plurality of partial condensation and separation treatment steps. A further object of the present invention is to produce a substantially pure maleic anhydride from a maleic acid solution while experiencing a minimum fumaric acid formation. These, and other objects of the present invention will be discussed more fully hereinbelow.

When naphthalene, or a similar aromatic compound, is oxidized catalytically, a certain amount of maleic anhydride is produced in addition to the primary product. Thus, for example, in the case of naphthalene, while the primary product is phthalic anhydride, there is always a considerable percentage of maleic anhydride produced which amount will vary with the nature of the catalyst and which can also be increased by the addition of certain compounds which oxidize directly to maleic anhydride, such as benzene, phenol, cresol, furane bodies and the like. In the catalytic oxidation of benzene and phenol, maleic anhydride is produced directly as the primary product. The vapor from the converter in a vapor-phase catalytic oxidation plant is normally led through condensers where the major portion of the primary product is condensed as a solid. Maleic anhydride, being relatively volatile, largely passes through the condensers, which are maintained at a regulated, sufficiently high temperature to condense relatively pure primary product and has to be washed out of the gases, as it otherwise produces a severe fume nuisance. Even where bezene, phenol, or similar compounds, are directly oxidized to maleic anhydride, there is also a considerable loss in the exhaust gas, due to the volatility of the anhydride. In the past, the fume nuisance hereinabove, which arose from the escape of maleic anhydride into the atmosphere, necessitated the scrubbing of the gases in so-called fume towers. The scrubbing is by water spray or spray of dilute alkali. In either case, a dilute solution of maleic acid or its salts was produced and allowed to run to waste because it cost more to recover maleic acid from dilute fume tower liquor than it does to produce maleic acid directly. In view of the great corrosiveness of maleic acid, (it is one of the strongest organic acids and is comparable to hydrochloric acid in its corrosiveness) the discharge of the fume tower liquor presented a considerable nuisance.

A great number of different processes have been disclosed for the recovery of maleic anhydride from maleic acid and from maleic acid aqueous solutions. Many of these prior art processes are, however, inoperative from a commercial standpoint or, if operative, are, at best, processes which have one or more shortcomings which make them expensive processes to operate. It is not considered necessary to recapitulate in detail these various prior art processes, as they are well known in the art.

I have discovered that I can recover, by a conversion process, maleic anhydride from comparatively dilute aqueous solutions of maleic acid by passing the dilute aqueous solution at a temperature approximating room temperature into a vaporization chamber, heated to a temperature substantially above the boiling point of water and maleic acid. This first vaporization chamber is enclosed in a steam jacket and the charge is heated sufficiently, i. e., about 125–140° C., to cause a vaporization of about 65%–85% of the total charge. The high temperature at which this chamber is maintained would cause total vaporization if it were not for the fact that the charge is passed therethrough at an extremely fast rate, so that the conversion of the maleic acid solution from the liquid to the vapor phase occurs partially but suddenly. As the partially vaporized maleic acid solution reaches the end of the first vaporization chamber, it is suddenly cooled to a temperature just above 120° C., but not appreciably greater than 130° C. Therein most of the acid is condensed while most of the water vapor is still maintained in the vapor phase, and the two components may be separated from one another readily. This particular step results in a marked concentration of the maleic acid solution to the point where nearly all of the unbound water that had been present in the initial maleic acid solution, as charged, is removed. This concentrated maleic acid solution, containing 70–90% maleic acid, based on the total weight of the solution, is then passed through a second vaporization chamber, heated sufficiently by some conventional heat transfer medium such as a eutectic mixture of diphenyl oxide and diphenyl (Dowtherm "A") or steam under super-atmospheric pressure to a temperature of about 160°–175° C., wherein a partial vaporization is again accomplished, up to about 50% of the total charge. Again, in this second vaporization chamber, the temperature is sufficiently high, not only to concentrate the maleic acid solution, but also to cause a substantial conversion by dehydration of the maleic acid to maleic anhydride. The pass through this chamber is, however, at such a speed so as to prohibit the total vaporization of the charge and, at the same time, is sufficiently fast so as to prevent or minimize the conversion of the maleic acid to fumaric acid. After the partially vaporized charge has passed through the second vaporization chamber, the charge is suddenly cooled in a combination condenser and separator to a temperature of about 130–160° C., but preferably not appreciably greater than 155° C., wherein the water vapor is maintained in the vapor phase and is separated from the maleic acid which has not as yet been converted to maleic anhydride and the maleic anhydride which has already been converted from maleic acid. Immediately thereafter, the mixture of the maleic acid and maleic anhydride with some insignificant amount of water may be passed through a third vaporization chamber wherein the charge is heated up to temperatures of about 180–195° C. by means of a jacketed wall surrounding the pipe-like chamber with a suitable heating material as before. Again, the charge is only partially vaporized, up to about 50% of the total charge. The temperature of this chamber is sufficiently high to convert substantially all of the maleic acid to maleic anhydride; but because of the speed with which the charge passes through this third vaporization chamber, the tendency toward the formation of fumaric acid from maleic acid is negligible. As the maleic anhydride passes out of the third vaporization chamber, it is led directly into a third combination condenser and separator, wherein the temperature of the charge is caused to drop to about 160–190° C. and the water vapor which was originaly bound water or water produced or released from the maleic acid in its conversion to maleic anhydride is separated from the product, and the maleic anhydride is recovered in substantially pure form. The vapor phase removed from the first cyclone separator and condenser is comprised of a very dilute aqueous solution of maleic acid and may be discarded or may be recycled to the fume tower to pick up more maleic acid. The vapor phase, removed from the second condenser and separator, is comprised of a comparatively concentrated solution of maleic acid and is recycled into the feeding chamber which is subsequently pumped into the first partial vaporization chamber. The vapor phase removed from the third cyclone, condenser and separator is a very substantially concentrated solution of maleic acid in water, but is not very substantial in volume, but may be recycled by passing it into a chamber to be combined with the condensate from the first cyclone condenser and separator, so as to pass through the second vaporization chamber. It is possible to accomplish my process by using only two phases to the process; namely, by having a first partial vaporization step, followed by a first partial condensation and separation step, followed by the second partial vaporization step, followed by the second condensation and separation step. In such a two-stage process, one would derive a resultant product which would be substantially free from all uncombined water, but would contain some small amount of maleic acid, in addition to a very substantial amount of maleic anhydride. The two-stage process will produce a resultant product containing about 90–93% maleic anhydride and the remaining portion will be substantially all maleic acid. If pure maleic anhydride is desired as the end product, wherein the maleic anhydride content is about 98% of the total recovered product, the third stage should be incorporated into the process.

Reference is made to the accompanying drawing, which represents the process for the conversion of maleic acid solutions to maleic anhydride in a three-stage process.

In the drawing, 1 is a jacketed chamber which surrounds the inner tube 2 through which the aqueous maleic acid solution is passed and heated to a temperature of about 125°–140° C., by means of steam, which is introduced at the duct 3 and is removed and returned to the steam boiler by means of the exit 4. The dilute aqueous maleic acid solution is brought from a reserve reservoir through the pipe 5 and is forced through the pump 6 into the first vaporization zone through which it is also passed at an exceedingly high rate, causing only partial vaporization of the aqueous solution, up to about 85% of the total charge. The partially vaporized charge passes out of the tube 2 into the partial condenser and separator 9 by means of the aperture 32 in the pipe or tube 2. The chamber 9 is maintained at a temperature above 120° C. but not appreciably greater than 130° C., thus resulting in a condensation of the partially vaporized charge, but not resulting in the condensation of the water vapor produced in the pass through the tube 2. The water vapor is removed through the aperture 35 into the tube 10 and is collected in the condenser 11 and may be drawn off through the aperture 25. The chamber 9 is in the nature of a combination cyclone separator and condenser. The liquid connected in the chamber 9 is drawn down toward the bottom of the separator and is forced through the pump 12 into and through the second vaporization chamber 14, which is surrounded by a jacket 13 through which a heating material is passed, so as to maintain the temperature of the chamber at about 200–300° C. (the charge reaches a temperature of 160°–175° C.) thereby causing partial vaporization of up to about 50% of the charge. A given particle of the charge is passed through the second vaporization chamber at a very rapid rate, in the order of magnitude of about 2–20 seconds per tube. The partially vaporized charge is removed from the tube 14 by means of the aperture 33 and is introduced into the second cyclone separator and condenser 16 wherein it is cooled to a temperature of about 130–160° C., wherein the maleic acid and the maleic anhydride are condensed out while the water vapor containing some maleic anyhdride is drawn off through the aperture 36 up into the tube 8 and is recycled to the first vaporization tube through the condenser 7, where it is passed down through the pipe 5 and the pump 6. The mixture of the maleic acid and the maleic anhydride which has been condensed in the separator 16 is then collected at the bottom of the chamber 16 and is pumped through the third vaporization chamber 19 by means of the pump 17. The chamber 19 is jacketed with a chamber 18 which is heated by means of a simple heat transfer material, such as "Dowtherm A," which is used to maintain the temperature of the third vaporization chamber at about 250–260° C. (This heats the charge to a temperature of 180–195° C.) The partially vaporized mixture is introduced into the condenser and separator 20 through the aperture 34. The chamber 20 is maintained at a temperature of about 160–195° C., thus cooling the charge to 160° C.–190° C., wherein a substantial part of the maleic anhydride is condensed and removed from the bottom of the chamber 20 by means of the exit 21. The remaining part of the mixture, that which is in the vapor phase, is withdrawn from the chamber 20 by means of the aperture 37, through which these vapors are drawn and are led up through the tube 22 and are recycled into the condenser 23 and are subsequently led down through the tube 15 into the pump 12, through which it is passed again to the second vaporization chamber. The boiler 24 contains a suitable heating medium, such as Dowtherm A, which is heated to a temperature sufficient to provide the heating medium in circulation through the pipe 26, which empties into the evaporator jacket 18 through the duct 27 and through the second evaporator 13 through the duct 28. The Dowtherm A is returned from the chambers 13 and 18 by way of the ducts 29 and 30 and the recycling of this heating medium maintains a well regulated temperature in the respective chambers. The pump 38 serves to keep the heat transfer medium in circulation. The thermostatic control box 31 is used to create a temperature differential between the vaporization chamber 14 and the third vaporization chamber 19. If desired, two separate boilers may be used; one each for the vaporization chambers 14 and 19. The jacketed tube 2 may be any suitable length and should be of comparatively small bore, such as about 2" in diameter and about 20' long. The rate of the movement of the charge through the tubes should be such as to permit only partial vaporization of the charge at the temperature. Since the main cause of difficulty encountered in the concentration and dehydration of maleic acid solutions is the isomerization of maleic acid to fumaric acid, it was discovered that the factors involved are the temperature, the time of heating and the concentration of the maleic acid during either the concentration or dehydration steps. Lowering of the temperature is limited by the freezing point of the maleic acid solutions, while all degrees of concentration must be passed through to produce pure maleic anhydride. Only the time may be varied. A decrease in residence time may be accomplished by increasing the speed of the pass of the charge so that its residence time in a given vaporization chamber is reduced to a satisfactory minimum. The charge then is introduced into these vaporization chambers, such as vaporization tubes 2, 14 and 19 and a given particle of the charge is forced to travel at a sufficient rate so as to pass through a tube twenty feet long in about 2–20 seconds; or, in other words, to pass a given distance of two feet within the tubes in about 0.2–2 seconds. At the temperature of tube 1, this rapid pass of the charge through the tube makes it possible to accomplish partial vaporization of the charge and, at the same time, makes it further possible to concentrate the dilute aqueous solution of the maleic acid and to convert a part of the maleic acid to maleic anhydride before it is extracted from the end of the tube 2 into the condensation and separation chamber 9. The second vaporization chamber 14 is somewhat smaller than the first vaporization chamber, not only in length but in bore. Although any suitable dimensions for the tube may be used, the vaporization tube 14 is about fifteen feet long and about 1.5" in internal diameter. This decrease in the dimensions of the tube automatically maintains a nearly constant velocity of the pass, so that the speed of the charge through tube 14 is substantially the same as tube 2. Due to the decrease in length of the tube and the diameter, and reduction in the charge the actual residence time of the charge in tube 14 is constant, thereby producing only a vaporization of up to about 50% of the total charge. This lower vaporization is due to the lower temperature differential between the jacket and the charge. The tube 19 in the third vaporization phase is substantially the same in length as the tube in the second vaporization stage, although the internal diameter of the tube is somewhat less. In this instance, the tube 19 is about 1" in internal diameter and about 15 feet long. The decrease in the diameter of the tube 19 of third vaporization phase causes the velocity of the pass through the tube to remain fairly constant. In order to illustrate more completely the concept of the present invention, the following example is set forth for the purpose of illustration only, in which all parts are parts by weight. It should be remembered that this example is solely for illustrative purposes, and any specific enumeration of detail should not be interpreted as a limitation on the case except as indicated in the appended claims.

*Example*

516 parts of an aqueous solution of maleic acid, containing 136 parts of maleic acid calculated as maleic anhydride, are introduced into the vaporization chamber 2 through the pump 6. The charge is passed through the chamber 2, heated with steam at a pressure sufficient to cause the vaporization of up to about 85% of the charge, and is extracted from the tube 2 through the opening 32 into the chamber 9. 226 parts of the charge are condensed in the chamber and are forced downward through the pump 12 into the second vaporization tube 14. At this point, the maleic acid content is about 166 parts calculated as maleic anhydride. To this charge there is added simultaneously in a recycling process 74 parts of a concentrated maleic anhydride solution from the condenser 20 which has been brought up from the tube 22 through the chamber 23 and down through the tube 15. The total charge into the chamber 14 is about 300 parts, of which 225 parts are maleic acid, calculated as maleic anhydride. The pass sent through the tube 14 is completed by extracting therefrom, through the opening 33 into the chamber 16, the charge and condensation takes place wherein 195 parts of the mixture of maleic acid and maleic anhydride are drawn down through the pump 17 into the third vaporization chamber 19. The vaporized part of the mixture in the chamber 16 is drawn up through the opening 36 and is recycled into the initial charge entering the vaporization chamber 2 through the reserve chamber 7, down through the pipe 5 and the pump 6. The condensate in the chamber 16 could be removed directly if a product containing about 90-92% maleic anhydride is desired, because the total number of parts that may be removed therefrom are, in the present instance, about 195 parts and this is comprised of about 178 parts of maleic anhydride and maleic acid which constitutes about a yield of 91% maleic anhydride. If a more pure product is desired, the 195 parts condensed in the chamber 16 may be passed through the vaporization chamber 19 and removed after having passed therethrough in the chamber 20, wherein there is condensed about 121 parts of a substantially pure maleic anhydride product, comprising about 119 parts of maleic anhydride or about 98% maleic anhydride. The remaining vaporized portion of the mixture is removed through the aperture 37 and is recycled into the second vaporization zone, as indicated before. The vaporized portion extracted from the first condenser and separator 9 is cycled through the tube 10 to the total condenser 11 and there is removed therefrom about 293 parts of a very dilute aqueous solution of the maleic acid containing about 20 parts of maleic acid calculated as maleic anhydride, which represents about a 7% solution. This dilute solution may be discarded, but preferably returned to the system in which the catalytic converter product is being absorbed in water to give the maleic acid solution which is the starting material for my process.

In the disclosure set forth hereinabove and in the accompanying drawing, the condenser and cyclone separators at the end of each vaporization phase are indicated as a combination unitary chamber. It will be obvious to anyone skilled in the art that these two chambers could be arranged in the system in separate independent relationship but it is preferred that they be used in a combination arrangement as best results are realized thereby.

In the discussion hereinabove, with respect to the various vaporization and condensation-separation steps, the temperatures set forth are those to which the charge should be heated or cooled depending on the particular step involved. To realize these temperatures, one would maintain the temperature of the first vaporization chamber at about 175-185° C. The second vaporization chamber should be heated to about 230° C. In the third vaporization chamber, one would heat to 250-260° C. In the first condensation chamber, one would cool the chamber to a temperature below 130° C., in the second condensation chamber, one would cool the chamber to a temperature below 160° C., whereas in the third condensation chamber, one would cool the chamber to a temperature below about 190° C.

I claim:

1. A continuous process for the conversion of maleic acid to maleic anhydride comprising passing an aqueous solution of maleic acid rapidly through an evaporator, wherein the charge is heated to a temperature of about 125-140° C. so as to cause a partial vaporization of up to about 85% of the charge, passing the partially vaporized charge into a combination condenser and separator, wherein the charge is cooled to a temperature greater than about 120° C. but not greater than about 130° C., wherein the vaporized water is separated from the mixture of maleic acid solution and maleic anhydride, passing said mixture rapidly through a second evaporator; wherein the charge is heated to a temperature of about 160°-175° C. so as to cause a partial vaporization of up to about 50% of the charge, passing the partially vaporized charge into a combination second condenser and separator, wherein the charge is cooled to a temperature between about 130-160° C., wherein the vaporized water is separated from the mixture of maleic acid and the maleic anhydride, passing the mixture rapidly through a third evaporator, wherein the charge is heated to a temperature of about 180°-195° C., so as to cause a partial vaporization of up to about 50% of the charge, passing the partially vaporized charge into a third combination condenser and separator, cooled sufficiently so as to reduce the temperature of the charge to between about 160-190° C., wherein the vaporized water released from the maleic acid in its conversion to maleic anhydride is substantialy completely removed and recovering a substantially pure maleic anhydride.

2. A continuous process for the conversion of maleic acid to maleic anhydride comprising passing an aqueous solution of maleic acid rapidly through an evaporator, wherein the charge is heated to a temperature of about 125-140° C., so as to cause a partial vaporization of up to about 85% of the charge, passing the partially vaporized charge into a combination condenser and separator, wherein the charge is cooled to a temperature between about 120-130° C., wherein the vaporized water is separated from the mixture of maleic acid solution and maleic anhydride, wherein said vaporized water is comprised of a substantial part of the unbound water from the solution, passing said mixture rapidly through a second evaporator, wherein the charge is heated to a temperature of about 160-175° C., so as to cause a partial vaporization of up to about 50% of the charge, passing the partially vaporized charge into a second combination condenser and separator, wherein the charge is cooled to a temperature between about 130-160° C., wherein the vaporized water is separated from the mixture of maleic acid and maleic anhydride, wherein said vaporized water is comprised of substantially all of the remaining unbound water and a substantial part of the water released from the maleic acid in its conversion to maleic anhydride, passing the mixture rapidly through a third evaporator, wherein the charge is heated to a temperature of about 180-195° C., so as to cause a partial vaporization of up to about 50% of the charge, passing the partially vaporized charge into a third combination condenser and separator, cooled sufficiently so as to reduce the temperature of the charge to between about 160-190° C., wherein the vaporized water released from the maleic acid in its conversion to maleic anhydride is substantially completely removed and recovering a substantially pure maleic anhydride.

References Cited in the file of this patent

UNITED STATES PATENTS

| Number | Name | Date |
| --- | --- | --- |
| 1,966,852 | Dvornikoff | July 17, 1934 |
| 1,966,853 | Dvornikoff | July 17, 1934 |
| 2,205,402 | Foster et al. | Jan. 13, 1937 |
| 2,211,160 | Punnett | Aug. 13, 1940 |
| 2,222,283 | Crowell | Nov. 19, 1940 |